United States Patent [19]

Miura et al.

[11] Patent Number: 5,551,297

[45] Date of Patent: Sep. 3, 1996

[54] PIPE CLOGGING DETECTING DEVICE

[75] Inventors: Yasuhiro Miura, Chiba; Yutaka Shiomi; Mituaki Sunada, both of Ichihara, all of Japan

[73] Assignee: Sumitomo Chemical Company, Limited, Osaka, Japan

[21] Appl. No.: 160,794

[22] Filed: Dec. 3, 1993

[30] Foreign Application Priority Data

Dec. 4, 1992 [JP] Japan ..................................... 4-325515

[51] Int. Cl.[6] .................................................. G01H 11/08
[52] U.S. Cl. .................................................................. 73/658
[58] Field of Search ............................. 73/592, 579, 587, 73/649, 658

[56] References Cited

U.S. PATENT DOCUMENTS

| | | | |
|---|---|---|---|
| 3,577,981 | 5/1971 | Kuris | 73/579 |
| 5,004,152 | 4/1991 | Baker et al. | 73/861.18 |
| 5,016,186 | 5/1991 | Toyoda et al. | 73/592 |
| 5,022,266 | 6/1991 | Cody et al. | 73/579 |
| 5,042,700 | 8/1991 | Ardell et al. | 222/590 |
| 5,193,406 | 3/1993 | Wolf et al. | 73/865.9 |
| 5,353,627 | 10/1994 | Diatschenko et al. | 73/19.03 |

FOREIGN PATENT DOCUMENTS

| | | |
|---|---|---|
| 62-240221 | 10/1987 | Japan . |
| 1288853 | 9/1974 | United Kingdom . |
| 2082324 | 3/1982 | United Kingdom . |
| 2132761 | 7/1984 | United Kingdom . |
| 2242271 | 9/1991 | United Kingdom . |

*Primary Examiner*—Hezron E. Williams
*Assistant Examiner*—Rose M. Finley
*Attorney, Agent, or Firm*—Birch, Stewart, Kolasch & Birch, LLP

[57] ABSTRACT

A pipe clogging detecting device which incessantly monitors states of a pipe through which fluid is flowing, and when clogging occurs, immediately alarms the occurrence of clogging to operators. The device includes a plurality of containers, a pipe interconnecting the containers, a vibration sensor provided on the pipe, and a detecting device for detecting the occurrence of clogging in the pipe, based on output signals from the vibration sensor.

20 Claims, 4 Drawing Sheets

PIPE CLOGGING DETECTING DEVICE

BACKGROUND OF THE INVENTION

1. Field of the Invention

This invention relates to a device for detecting clogging of a pipe through which fluid flows, especially pulverized objects, slurry, and similar fluids.

2. Related Background Art

In a polyolefin production plant, for example, polyolefin produced in a fluidized bed olefin polymerization reactor is transported to a reactor of a next process, or a reservoir through a transportation pipe.

Temperature at the exit of the fluidized olefin polymerization reactor and in a pipe for the transportation is 60°–100° C. At this temperature range polyolefin has such high viscosity and solidification that there is a risk that it may clog the transportation pipe.

To avoid such risk in transporting polyolefin from the fluidized bed polyolefin polymerization reactor to a next process, generally a pressure difference of 3–25 kg/cm$^2$ is generated between the polymerization reactor and the next process to transport the polyolefin at high speed by the pressure difference.

Conventionally, the clogging of the transportation pipe is prevented by transporting polyolefin at high speed, but still the transportation pipe tends to clog. In the fluidized bed olefin polymerization reactor, for example, sometimes lumps are formed in the reaction process, and the lumps stick to valves of the transportation pipe and clog the pipe.

To detect clogging of the transportation pipe, conventionally operators on patrol press a sound scope stick against the transportation pipe and directly listen to vibratory sounds of the transportation pipe caused by the flow of polyolefin to detect the occurrence of clogging.

Thus, the detection of clogging of the transportation pipe of the polyolefin depends on human audition. Such detection results sometimes contain personal differences, and there is a risk that clogging may be overlooked.

Since the patrol is periodic, if the transportation pipe are clogged immediately after a patrol, the operation is continued with the clogging unremoved, and a clogging state is worsened. When the operation is continued with the clogging state unremoved, the clogging material is solidified, and the transportation pipe sometimes has to be removed and changed.

But, since the polyolefin is transported through the transportation pipe at a flow rate as high as 10–300 m/s, it is very difficult to utilize flow meters and electrodes. The presence of projections, such as flow meters, electrodes, etc., in the transportation pipe can be sources of the clogging and adversely enhance the clogging.

The above-described problem is not limited to the transportation pipe for polyolefin and arises in transportation pipes for other pulverized materials, slurry, etc.

SUMMARY OF THE INVENTION

In view of the above-described problem this invention has been made. An object of this invention is to provide a pipe clogging detecting device which incessantly monitors states of a pipe through which fluid is flowing, and when clogging occurs, immediately alarms the occurrence to operators.

Another object of this invention is to provide means for removing a clog from a pipe when clogging is detected.

The above-described objects and other objects of this invention will be apparent from the following description.

Provided according to the present invention is a pipe clogging detecting device comprising a plurality of containers, a pipe interconnecting said containers, said pipe being apt to be clogged with fluid passing through said pipe, a vibration sensor provided on said pipe, said vibration sensor detecting vibrations generated when the fluid passes through said pipe, and detecting means for detecting occurrence of clogging in said pipe, based on output signals from said vibration sensor.

When the pipe is not clogged, fluid flows through the pipe, and vibrations generated by the flow of the fluid are of a higher level. As clogging develops, the level of vibrations decreases. Accordingly, the clogging state in the pipe can be detected by converting the vibrations into electric signals with a vibration sensor provided on the pipe, and analyzing the electric signals.

Output signals of the vibration sensor contain those of vibrations which are not associated with the fluid through the pipe, i.e., vibrations generated by motors, etc. in the plant. Accordingly, it is preferable that only the signals of a frequency band corresponding to vibrations generated by the fluid through the pipe are extracted.

When the pipe is clogged, the clogging objects can be forcedly removed by feeding a purge gas of high pressure into the pipe. Purge gas can be fed into spaced-apart locations along the pipe for removing a clog within the pipe. More specifically, purge gas may be alternately applied at the spaced-apart locations to produce a flow through said pipe in a first direction or, alternately, in a second opposite direction. The procedure for producing this flow in the different directions is described in more detail below.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

This invention will be explained by means of preferred embodiments with reference to the drawings attached hereto.

Embodiment 1

Figure 1:
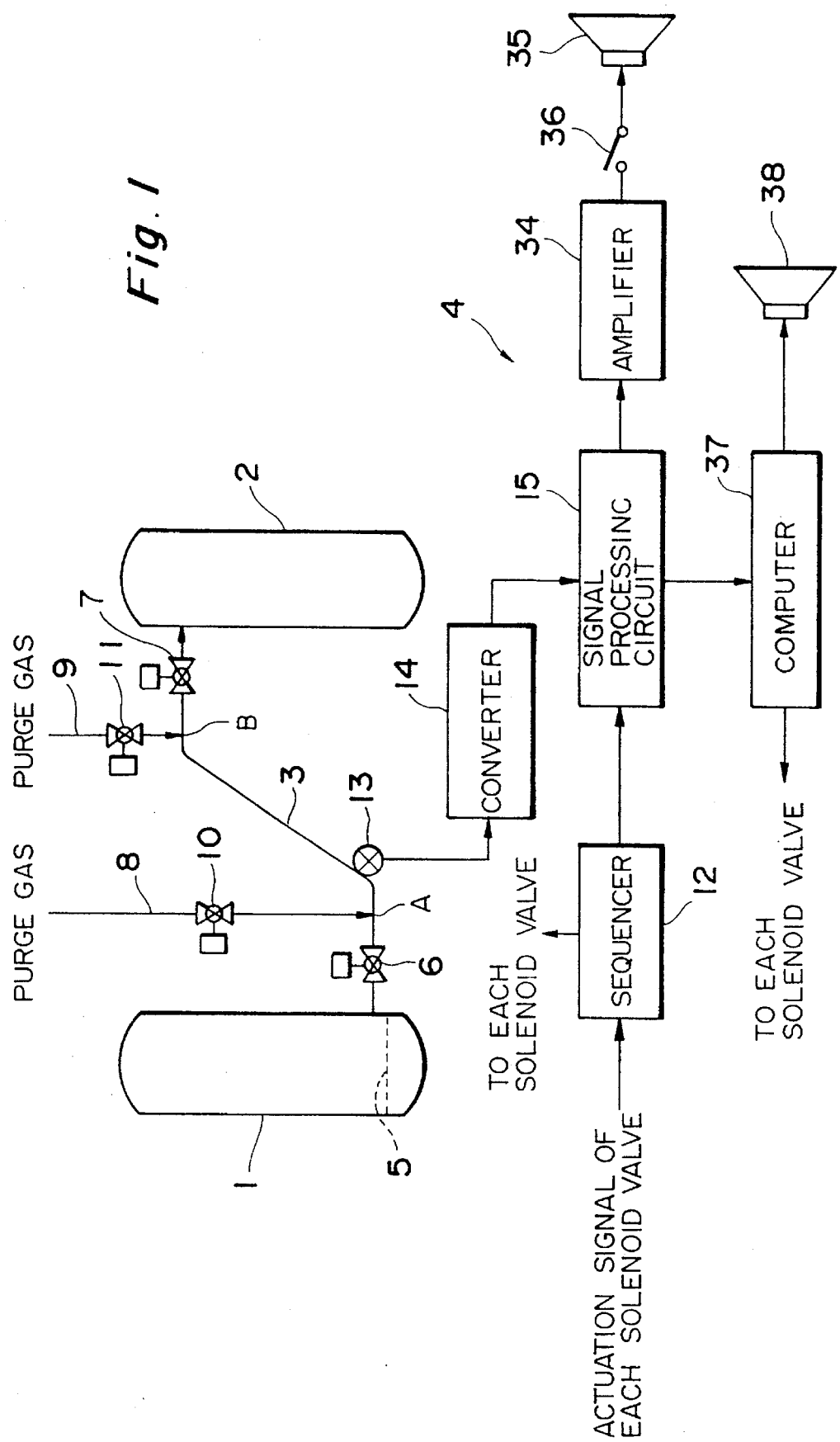
FIG. 1 is a block diagram of the clogging detecting device according to Embodiment 1 of this invention which is applied to a transportation pipe of a fluidized bed olefin polymerization reactor.

FIG. 1 shows the clogging detecting device 4 according to this invention which is used in a transportation pipe 3 between a fluidized bed olefin polymerization reactor 1 and a product hopper 2. In the fluidized olefin polymerization reactor 1, there exists a mixed phase of a gas and a pulverized body, and it is fluidized by the circulating gas and fresh gas (not shown) fed from below a distribution plate 5. When a catalyst is injected into the mixed phase in this state, a polymerization reaction goes on, and polyolefin is produced. Pressure in the fluidized bed olefin polymerization reactor 1 is about 10–30 kg/cm$^2$G, and temperature therein is about 70°–100° C.

The polyolefin produced in the fluidized bed olefin polymerization reactor 1 is transported to the product hopper 2 through the transportation pipe 3 by means of pressure difference between the reactor 1 and the product hopper 2. A solenoid valve 6 is disposed near the exit of the fluidized olefin polymerization reactor 1 in the transportation pipe 3. A solenoid valve 7 is disposed near the entrance of the product hopper 2. When the plant is in operation, the solenoid valve 6 is normally opened, and the solenoid valve 7 is periodically opened and closed, so that the polyolefin is intermittently transported. The solenoid valve 7 is opened generally for a short period of time of 10–60 seconds.

In the fluidized bed olefin polymerization reactor 1 it sometimes happens that some lumps are formed in the process of the reaction and clog the transportation pipe 3 itself or the solenoid valves 6, 7, with the result that the polyolefin cannot be taken out of the fluidized bed olefin polymerization reactor 1.

To avoid such situation, generally the transportation pipe 3 is connected to a pipe for feeding a purge gas for precluding the clogging and removing the clogging objects. In the shown embodiment, purge gas feed pipes 8, 9 are connected immediately after the solenoid valve 6 and immediately before the solenoid valve 7 respectively. The respective purge gas feed pipes 8, 9 have solenoid valves 10, 11. The solenoid valves 10, 11, and the solenoid valves 6, 7 in the transportation pipe 3 are suitably opened and closed so that a purge gas of higher pressure than the interior of the fluidized olefin polymerization reactor 1 is fed into the transportation pipe 3, and the interior of the transportation pipe 3 is cleaned, or the clogging objects are forcedly removed.

In the normal plant operation, when the transportation of polyolefin is stopping, by closing the solenoid valve 7 and opening the solenoid valve 11 concurrently, the high pressure purge gas is caused to flow reversely from a feed point B to the fluidized bed olefin polymerization reactor 1 through the transportation pipe 3 to preclude the clogging. During this operation, the solenoid valve 10 in the purge gas feed pipe 8 is closed. The actuation of the solenoid valves 6, 7, 10, 11 are sequentially controlled by a sequencer 12.

The clogging detecting device 4 according to this invention includes a vibration sensor 13. The vibration sensor 13 is mounted on the outer surface of the middle portion of the transportation pipe 3. The vibration sensor 13 converts vibrations caused by the polyolefin or the purge gas flowing through the transportation pipe 3 into electric signals. The vibration sensor 13 is provided by a piezoelectric element or other similar devices. The electric signals from the vibration sensor 13 are converted by a converter 14 into voltage level signals which are easy to process, and supplied to a signal processing circuit 15.

Figure 2:
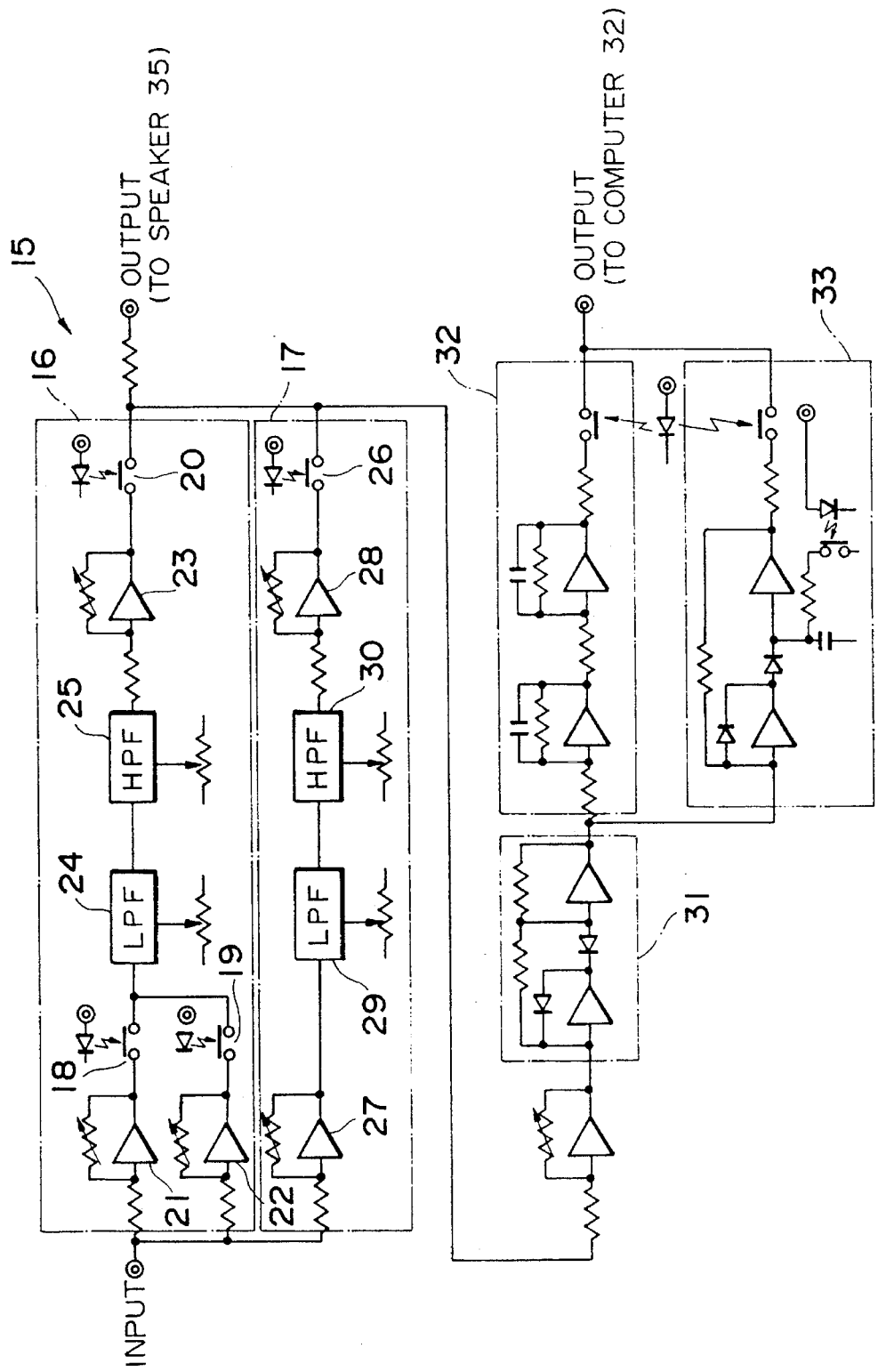
FIG. 2 is an electric circuit diagram of one example of a signal processing circuit of the clogging detecting device according to Embodiment 1.

FIG. 2 shows one example of the signal processing circuit 15. The forward half of the signal processing circuit 15 consists of partial circuits 16, 17. The partial circuit 16 includes switches 18–20, amplifiers 21–23, a low-pass filter 24 and a high-pass filter 25. The partial circuit 17 includes a switch 26, amplifiers 27, 28, a low-pass filter 29 and a high-pass filter 30.

The partial circuit 16 detects vibrations caused by the flow of the purge gas. The low-pass filter 24 and the high-pass filter 25 pass only signals of a frequency band (1.5 k–4 kHz) corresponding to vibrations caused by the flow of the purge gas and cut off other signals corresponding to vibrations caused by motors, etc. in the plant. The partial circuit 17 detects vibrations caused by the flow of the polyolefin. The low-pass filter 29 and the high-pass filter 30 pass only signals of a frequency band (0.5 k–1.5 kHz) corresponding to vibrations caused by the flow of the polyolefin.

The switches 18, 19 turn on when the respective solenoid valves 10, 11 are opened. The switch 20 turns on when either of the solenoid valves 10, 11 is opened. The switch 26 turns on when the solenoid valve 7 is opened. These switches 18, 19, 20 and 26 are actuated in response to a signal from the sequencer 12. The sequencer 12 is incessantly supplied with actuation signals as answer-back signals from the respective solenoid valves 6, 7, 10, 11.

The thus extracted electric signals of the specific frequency bands by the partial circuits 16, 17 of the signal processing circuit 15 are inputted to the amplifier 34 and amplified to be listened to as flow sounds of the polyolefin or purge gas through the transportation pipe 3 by a speaker 35 as electric-acoustic transducing means disposed in a centralized control room (not shown). It is preferable that the switch 36 is turned on and off so that the speaker 35 timingly utters flow sounds.

The signal processing circuit 15 includes an average processing circuit 32 and a peak retaining circuit 33. Electric signals of the specific frequency bands extracted by the partial circuits 16, 17 of the forward stage are rectified by a rectifying circuit 31, and then outputted to the computer (detecting means) 37 through the average processing circuit 32 and the peak retaining circuit 33.

Figure 3:
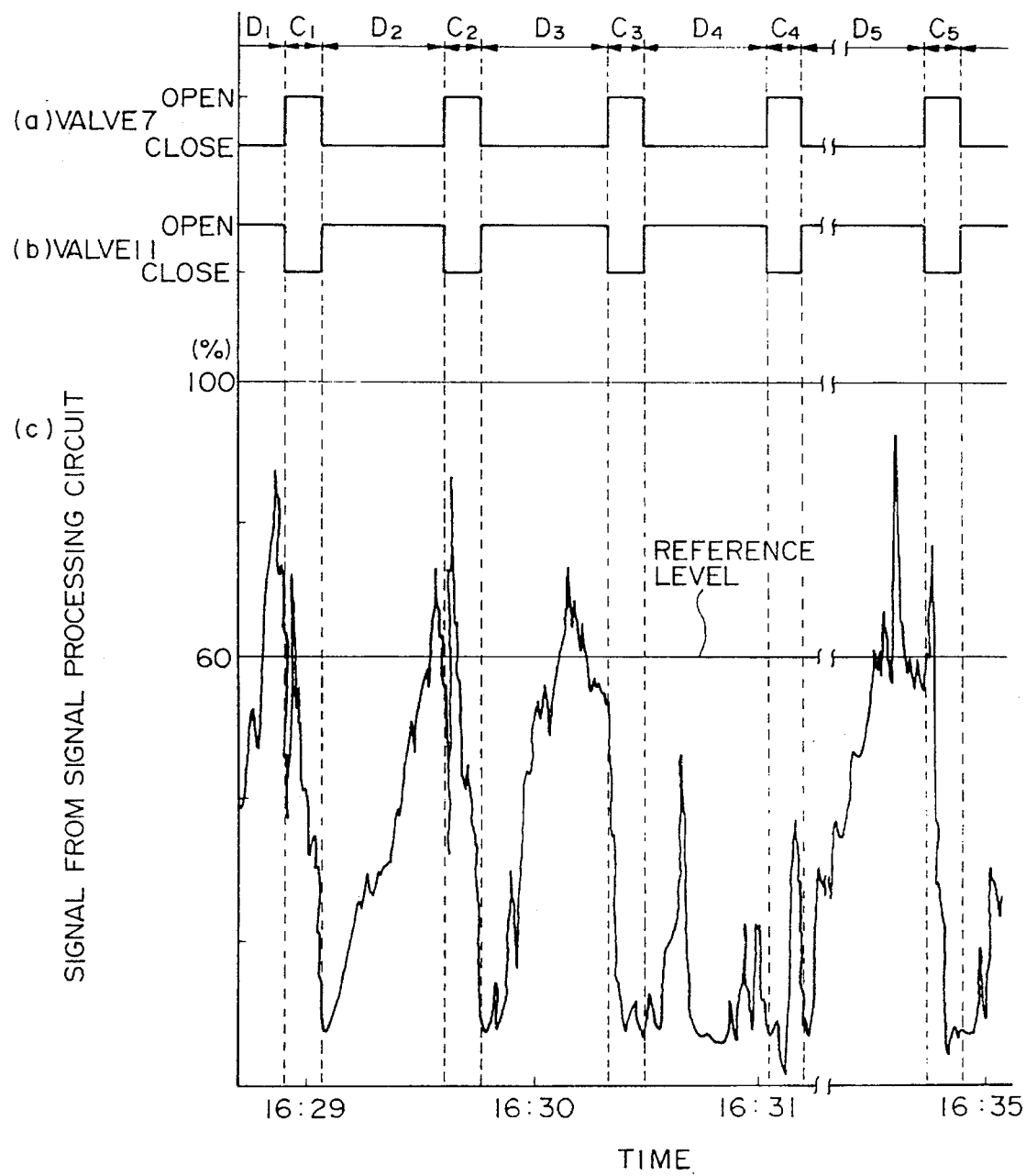
FIG. 3 is graph of one example of trend records taken by a computer of the clogging detecting device according to Embodiment 1, (a) indicating actuation signals for the solenoid valves in the transportation pipe line, (b) representing actuation signals for the solenoid valves in a purge gas feed pipe, (c) representing signals from the signal processing circuit.

The computer 37 is supplied with signals of the vibration sensor 13, and actuation signals of the respective solenoid valves 6, 7, 10, 11 through the sequencer 12 and the signal processing circuit 15, and these signals are recorded as trend records. FIG. 3 shows one example of trend records recorded by the computer 37. (a) represents actuation signals of the solenoid valve 7 in the transportation pipe, (b) indicates actuation signals of the solenoid valve 11 in the purge gas feed pipe 9, and c represents output signals from the signal processing circuit.

As shown at (a) and (b) in FIG. 3, the solenoid valves 7, 11 are periodically opened and closed alternately.

When the solenoid valve 7 is opened (sections $C_1$–$C_5$), the solenoid valves 10, 11 are closed. The solenoid valve 6 is normally opened. In this state, the polyolefin is transported from the fluidized bed olefin polymerization reactor 1 to the product hopper through the transportation pipe 3.

In this state, the switch 26 is on, the other switches 18, 19, 20 being off. Signals of the vibration sensor 13 through the converter 14 are converted into signals of suitable magnitudes by the amplifier 27, then those of the signals which have frequencies outside a range of 0.5 k–1.5 kHz are cut off by the low-pass filter 29 and the high-pass filter 30. The extracted signals are converted into signals of suitable magnitudes by the amplifier 28, and supplied to the speaker 35 and the rectifying circuit 31 and outputted from the signal processing circuit 15.

When the solenoid valve 11 is opened (sections $D_1$–$D_5$), the solenoid valves 7, 10 are closed, and the purge gas is fed into the fluidized bed olefin polymerization reactor 1 through the transportation pipe 3 from the purge gas feed pipe 9.

In this state, the switches 19, 20 are on, the other switches 18, 26 being off. Signals of the vibration sensor 13 are converted into signals of suitable magnitudes by the amplifier 22, then those of the signals which have frequencies outside a range of 1.5 k–4 kHz are cut off by the low-pass filter 24 and the high-pass filter 25. The extracted signals are converted into signals of suitable magnitudes by the amplifier 23, and supplied to the speaker 35 and the rectifying circuit 31 and outputted from the signal processing circuit 15.

In the sections $C_1$, $C_2$, $C_5$, peak values of signals from the signal processing circuit 15 are above 60% of the maximum peak value, and the transportation pipe 3 is not clogged. It is shown that the polyolefin is being smoothly transported. In the sections $D_1$, $D_2$, $D_3$, $D_5$ as well, peak values of signals are sufficiently large. It is shown that the purge gas smoothly flows reversely. But in the sections $C_3$, $C_4$, and the section $D_4$, peak values of signals are so small that it is shown that clogging has take place in the transportation pipe 3.

The computer 37 beforehand stores a set reference level (60% of the maximum value in this embodiment) based on this finding to judge whether or not peak values of signals in the respective sections C, D are above the reference level. When a peak value of the signals are below the set reference level, the computer 37 actuates suitable alarming means, such as an alarm speaker 38 or others to alarm to operators in the centralized control room that the transportation pipe 3 is clogged.

When an alarm is made, the operators interrupt the control of actuating the solenoid valves 6, 7, 10, 11 by the sequencer 12 and instead operate a control board in the centralized control room to remotely open and close the solenoid valves 6, 7, 10, 11 so as to remove the clogging by means of the purge gas. Various modes of the flow of the purge gas can be proposed.

For example, first after all the solenoid valves 6, 7, 10, 11 are closed, the solenoid valve 10 is opened. Then the solenoid valve 6 is opened to feed the purge gas of a higher pressure than a pressure in the fluidized bed olefin polymerization reactor 1 from the purge gas feed pipe 8 into the transportation pipe 3 to cause the purge gas to reversely flow into the fluidized bed olefin polymerization reactor 1. Clogging of the transportation pipe 3 between the feed point A and the fluidized bed olefin polymerization reactor 1, and the solenoid valve 6 is removed.

When this operation fails to remove the clogging, after all the solenoid valves 6, 7, 10, 11 are closed, the solenoid valve 11 is opened, and in addition the solenoid valve 6 is opened. And the high-pressure purge gas is fed into the transportation pipe 3 from the purge gas feed pipe 9 to be caused to reversely flow into the fluidized bed olefin polymerization reactor 1.

When clogging has occurred between the feed point B and the product hopper 2, the above-described operations cannot remove the clogging. The next operation is necessary. First all the solenoid valves 6, 7, 10, 11 are closed, and then the solenoid valves 11, 7 are sequentially opened to feed the purge gas from the feed point B into the transportation pipe 3 to be sent under pressure into the product hopper 2.

When this operation cannot remove the clogging, the solenoid valves 11, 6 are closed, the solenoid valves 10, 7 are opened to cause the purge gas to flow from the feed point A to the product hopper 2.

The operators suitably combine the above-described four modes, listening to alarms from the speaker 35. Repetition of combinations of the four modes by several times can normally remove clogging.

Thus, according to the pipe clogging detecting device according to Embodiment 1 of this invention, operators can detect a clogging state of the pipe in a remote centralized control room or others without going to the pipe, and can quickly perform a suitable procedure for removing the clog. Accordingly, a situation in which clogging objects have solidified, and the transportation pipe has to be dismounted to remove the solidified clogging objects can be precluded.

A detection of clogging can be followed by removal of the clog, and accordingly manual labor of operators can be decreased.

In addition, this invention can contribute to stable operation of the plant including the pipe, and rationalization of patrols in the plant.

Embodiment 2

Figure 4:
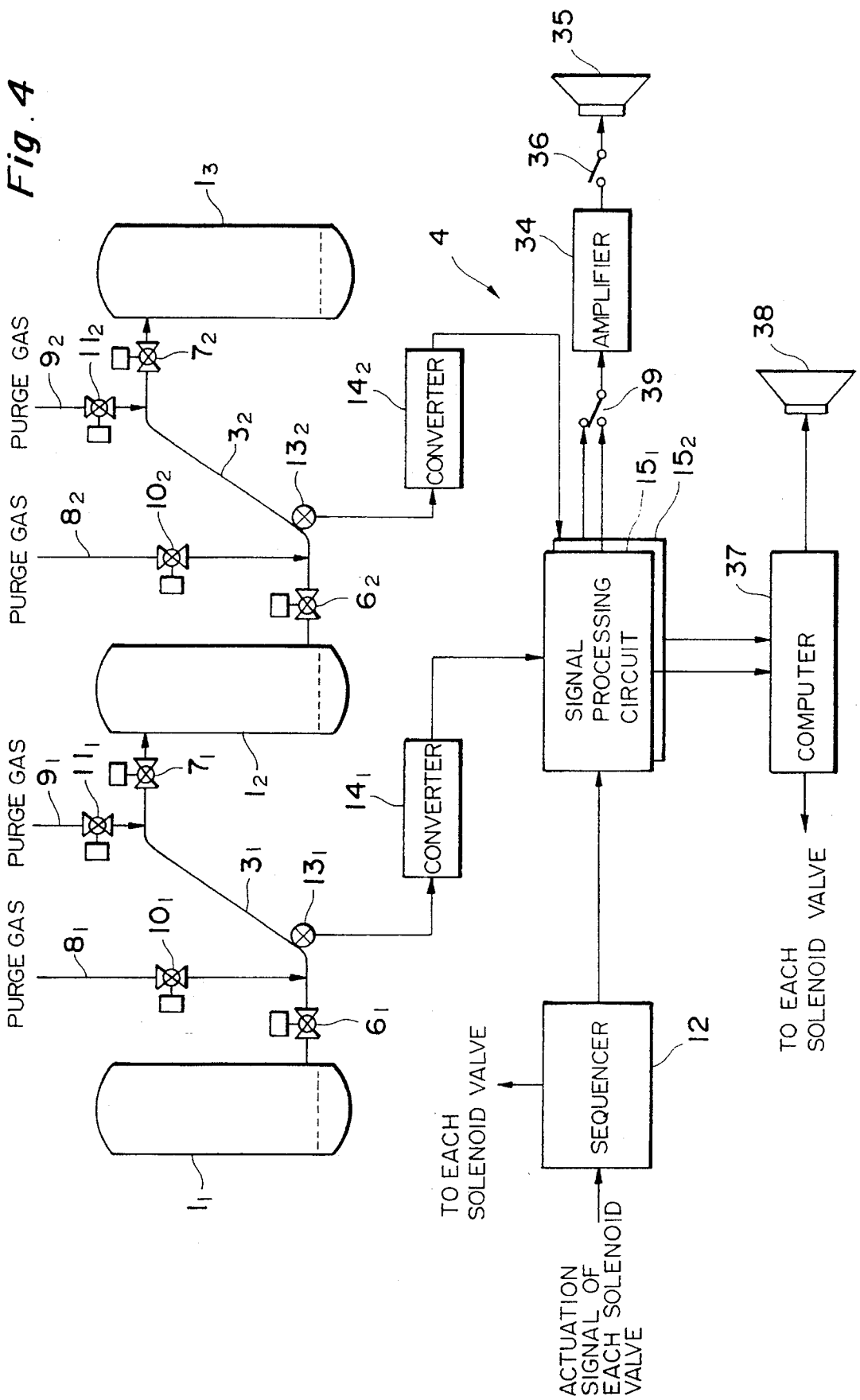
FIG. 4 is a block diagram of the clogging detecting device according to Embodiment 2 applied to a system including a plurality of transportation pipes.

FIG. 4 shows a system including a plurality of transportation pipes $3_1$, $3_2$. In this embodiment vibration sensors $13_1$, $13_2$ are provided respectively on the transportation pipes $3_1$, $3_2$. A clogging detecting device 4 includes a number of signal processing circuits $15_1$, $15_2$ corresponding to a number of the vibration sensors $13_1$, $13_2$. The clogging detecting device 4 also includes change-over switch 39. Each signal processing circuit $15_1$, $15_2$ includes low-pass filters, high-pass filters, amplifiers, etc. Frequencies and amplifying ratios are optimumly set depending on vibration characteristics of the transportation pipes $3_1$, $3_2$. Operators can listen to sounds corresponding to vibrations of the transportation pipes $3_1$, $3_2$, changing over output signals of the signal processing circuits $15_1$, $15_2$ by the switch 39. By following the same procedure as in Embodiment 1, clogging in the transportation pipes $3_1$, $3_2$ can be removed. The operators can listen to alarms from a speaker 38.

With reference to FIG. 4, a system including two transportation pipes $3_1$, $3_2$, and three reactors $1_1$–$1_3$ has been explained. This invention can be applied to large-scale systems including more than two transportation pipes, and more than three reactors in the same way as above.

In Embodiments 1 and 2, the clogging detecting device 4 according to this invention is applied in the transportation pipe 3 from the fluidized olefin polymerization reactor 1, but this invention is not limited to such an application. This invention is applicable to detection of clogging in the general fluid transportation pipes.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A pipe clogging detecting device comprising:

a plurality of containers;

a pipe interconnecting said containers, said pipe being susceptible to clogging by a fluid passing through said pipe;

a vibration sensor provided on said pipe, said vibration sensor detecting vibrations generated when the fluid passes through said pipe;

detecting means for detecting occurrence of clogging in said pipe, based on output signals from said vibration sensor; and purge gas feeding means for feeding purge gas into spaced-apart locations along said pipe for removing a clog;

whereby said purge gas may be alternately applied at said spaced-apart locations to produce a flow through said pipe in a first direction or alternately in a second opposite direction.

2. The pipe clogging detecting device according to claim 1, wherein said detecting means extracts a frequency band out of output signals of said vibration sensor signals, said frequency band corresponding to the vibrations generated by the fluid flow through said pipe, and determines that said pipe is clogged when the signals of the frequency band are below a set reference level.

3. The pipe clogging detecting device according to claim 1, wherein said detecting means includes an average processing circuit for averaging the output signals of said vibration sensor.

4. The pipe clogging detecting device according to claim 1, wherein
the detecting means includes a peak retaining circuit for retaining peak values of the output signals of said vibration sensor.

5. The pipe clogging detecting device according to claim 1, further comprising alarming means for providing an alarm when clogging is detected in said pipe by said detecting means.

6. The pipe clogging detecting device according to claim 1, further comprising means for converting the output signals of said vibration sensor into sounds.

7. The pipe clogging detecting device according to claim 1, wherein the fluid within said pipe includes polyolefin.

8. The pipe clogging detecting device according to claim 1, wherein
there are provided a plurality of pipes;
there are provided the same number of vibration sensors as said pipes; and
there are provided the same number of detecting means as said vibration sensors.

9. A pipe clogging detecting device comprising:
a plurality of containers;
a pipe interconnecting said containers, said pipe being susceptible to clogging by a fluid passing through said pipe;
a vibration sensor provided on said pipe, said vibration sensor detecting vibrations generated when the fluid passes through said pipe;
detecting means for detecting occurrence of clogging in said pipe, based on output signals from said vibration sensor, wherein
said detecting means extracts a frequency band out of output signals of said vibration sensor signals, said frequency band corresponding to the vibrations generated by the fluid flow through said pipe, and determines that said pipe is clogged when the signals of the frequency band are below a set reference level;
the fluid within said pipe is polyolefin and a purge gas for removing clogging in said pipe;
there is provided purge gas feeding means for feeding the purge gas into said pipe;
there is provided valve means for causing one of the polyolefin and the purge gas to flow through said pipe; and
the frequency band is 0.5 kHz–1.5 kHz when the fluid admitted into said pipe by said valve means is the polyolefin.

10. The pipe clogging detecting device according to claim 9, wherein said detecting means includes an average processing circuit for averaging the output signals of said vibration sensor.

11. The pipe clogging detecting device according to claim 9, wherein
the detecting means includes a peak retaining circuit for retaining peak values of the output signals of said vibration sensor.

12. The pipe clogging detecting device according to claim 9, further comprising alarming means for providing an alarm when clogging is detected in said pipe by said detecting means.

13. The pipe clogging detecting device according to claim 9, further comprising means for converting the output signals of said vibration sensor into sounds.

14. The pipe clogging detecting device according to claim 9, wherein
there are provided a plurality of pipes;
there are provided the same number of vibration sensors as said pipes; and
there are provided the same number of detecting means as said vibration sensors.

15. A pipe clogging detecting device comprising:
a plurality of containers;
a pipe interconnecting said containers, said pipe being susceptible to clogging by a fluid passing through said pipe;
a vibration sensor provided on said pipe, said vibration sensor detecting vibrations generated when the fluid passes through said pipe;
detecting means for detecting occurrence of clogging in said pipe, based on output signals from said vibration sensor, wherein
said detecting means extracts a frequency band out of output signals of said vibration sensor signals, said frequency band corresponding to the vibrations generated by the fluid flow through said pipe, and determines that said pipe is clogged when the signals of the frequency band are below a set reference level;
the fluid within said pipe is polyolefin and a purge gas for removing clogging in said pipe;
there is provided purge gas feeding means for feeding the purge gas into said pipe;
there is provided valve means for causing one of the polyolefin and the purge gas to flow through said pipe; and
the frequency band is 1.5 kHz–4 kHz when the fluid admitted into said pipe by said valve means is the purge gas.

16. The pipe clogging detecting device according to claim 15, wherein said detecting means includes an average processing circuit for averaging the output signals of said vibration sensor.

17. The pipe clogging detecting device according to claim 15, wherein
the detecting means includes a peak retaining circuit for retaining peak values of the output signals of said vibration sensor.

18. The pipe clogging detecting device according to claim 15, further comprising alarming means for providing an alarm when clogging is detected in said pipe by said detecting means.

19. The pipe clogging detecting device according to claim 15, further comprising means for converting the output signals of said vibration sensor into sounds.

20. The pipe clogging detecting device according to claim 15, wherein there are provided a plurality of pipes;

there are provided the same number of vibration sensors as said pipes; and there are provided the same number of detecting means as said vibration sensors.

* * * * *